United States Patent [19]
Rey et al.

[11] Patent Number: 5,641,003
[45] Date of Patent: Jun. 24, 1997

[54] PROCESS FOR THE REPLACEMENT OF A HYDRAULIC FLUID CONTAINED IN A CONTROL CIRCUIT SUCH AS AN AIRCRAFT CIRCUIT

[75] Inventors: Bertrand Rey; Claude Saint-Amans, both of Blagnac, France

[73] Assignee: Societe Nationale Industrielle et Aerospatiale, Paris Cedex, France

[21] Appl. No.: 418,206

[22] Filed: Apr. 7, 1995

[30] Foreign Application Priority Data

Apr. 8, 1994 [FR] France .................................. 94 04187

[51] Int. Cl.$^6$ .................................................. F15B 1/00
[52] U.S. Cl. ................................ 141/1; 141/65; 141/98; 184/1.5; 188/352
[58] Field of Search ......................... 141/1, 2, 4, 5, 141/7, 18, 21, 59, 65, 67, 98; 188/352; 184/1.5

[56] References Cited

U.S. PATENT DOCUMENTS

| | | | |
|---|---|---|---|
| 2,295,539 | 9/1942 | Beach | 188/352 |
| 4,095,673 | 6/1978 | Takeuchi | 184/1.5 |
| 4,624,291 | 11/1986 | Compton et al. | 141/1 |
| 5,060,703 | 10/1991 | Koerner | 141/59 |
| 5,083,433 | 1/1992 | Leigh-Monstevens | 141/98 X |
| 5,088,529 | 2/1992 | Jones et al. | 141/59 |
| 5,318,080 | 6/1994 | Viken | 141/98 |
| 5,370,160 | 12/1994 | Parker | 141/98 |

FOREIGN PATENT DOCUMENTS

| | | |
|---|---|---|
| 2360775 | 3/1978 | France . |
| 2254814 | 5/1973 | Germany . |
| 2927971 | 1/1981 | Germany . |
| 1142216 | 2/1969 | United Kingdom . |
| 2086989 | 5/1982 | United Kingdom . |

*Primary Examiner*—J. Casimer Jacyna
*Attorney, Agent, or Firm*—Michael N. Meller

[57] ABSTRACT

The hydraulic fluid contained in a control circuit such as an aircraft circuit is replaced by expelling the spent fluid with new fluid. For this purpose the tank (10) is disconnected from the circuit after depressurizing and emptying it. The suction branch (18) is then connected to a new fluid supply (42) to return branch (34) a casing of a high pressure filter (30) and a reservoir (48) for recovering the spent fluid. The fluid is transferred sectionwise by operating pumps (22, 4) and by manipulating the control devices (28a, 28b). A check on the transferred fluid volume makes it possible to ensure that the replacement has taken place. Following a disconnection of the supply device (42) from the reservoir (48), the tank (10) is connected to the control circuit, filled and repressurized.

12 Claims, 2 Drawing Sheets

PROCESS FOR THE REPLACEMENT OF A HYDRAULIC FLUID CONTAINED IN A CONTROL CIRCUIT SUCH AS AN AIRCRAFT CIRCUIT

BACKGROUND OF THE INVENTION

1. Field of the Invention P The invention relates to a process for making it possible to replace the hydraulic fluid contained in a possibly complex control circuit such as a hydraulic control circuit of an aircraft.

2. Description of the Prior Art

Although the process according to the invention is particularly suitable for the replacement of the hydraulic fluid contained in the hydraulic control circuits of aircraft,, it can also be used in numerous other technical fields without passing outside the scope of the invention.

A hydraulic control circuit generally includes a tank in which the hydraulic fluid is stored under pressure. The hydraulic fluid contained in the tank is sampled or tapped by one or more pumps through a suction branch and is then delivered under pressure to each of the control means of the circuit by a delivery branch, before being returned to the tank by a low pressure return branch.

In complex hydraulic control circuits such as those equipping aircraft, one or more high pressure filters are placed in the delivery branch. Moreover, a general filter is placed in the return branch immediately upstream of the tank.

The presence of one or more filters in the hydraulic control circuits makes it possible to filter any particles present in the hydraulic fluid Consequently the pollution of said fluid by solid particles is maintained within acceptable limits. Moreover, in the particular case of circuits equipping aircraft, a ground connection system makes it possible to connect the circuits to an external filtering installation designed for eliminating this type of pollution.

However, these filtration means have no effect in the case of a chemical pollution of the hydraulic fluid contained in the circuit. Such a pollution can be caused by the introduction into the circuit of an incompatible fluid, acid formation or overheating leading to the deterioration of the characteristics of the fluid.

When such a chemical pollution occurs, only a complete change of the hydraulic fluid contained in the circuit restores the quality of said fluid. It may also prove necessary to replace the fluid present in the circuit in order to change the fluid type used.

In both cases, the replacement of the hydraulic fluid contained in the circuit can at present not take place without having recourse to at least one of two existing processes.

A first of these processes comprises of emptying the tank, filling it with the new fluid, operating the control means and repeating this cycle several times. It is clear that this process only permits a partial replacement of the hydraulic fluid. Moreover, a satisfactory replacement of the fluid can only be obtained by multiplying the number of cycles.

Another known process for emptying the hydraulic fluid contained in the control circuit comprises of emptying the tank and disconnecting the pipes forming the circuit at several locations, so as to bring about a sectionwise elimination of the spent hydraulic fluid. However, this method leads to the introduction of air and particle-type pollution into the circuit It can also lead to leaks or to the forgetting to reconnect all the pipes.

SUMMARY OF THE INVENTION

An object of the present invention is to provide a simplified process making it possible to replace the hydraulic fluid contained in a control circuit without suffering from the disadvantages of existing processes, i.e. it permits the replacement of substantially all the fluid without dismantling the circuit and without risking the introduction into it of air or particle pollution and without risking the formation of leaks or giving rise to a possibility of forgetting reconnect the sections.

This result is obtained by a process for the replacement of a hydraulic fluid contained in a control circuit including a tank, at least one suction branch connecting the tank to at least one pump, at least one delivery branch connecting the pump to at least one control means, and at least one return branch connecting the control means to the tank, said process comprising the following steps:

depressurizing, emptying and disconnecting of the tank, connection of a new fluid supply means and a spent fluid recovery reservoir respectively on the suction branch and on the return branch, substantially in place of the tank, replacing of the hydraulic fluid by operating the pump, so as to force the spent fluid into the recovery reservoir with new fluid being drawn from the supply means, disconnecting of the supply means and the recovery reservoir, connecting the tank to the suction branch and to the return branch and then filling and pressurizing the tank.

A feature of this process, is that only the connectors connecting the tank to the remainder of the circuit are disconnected. The fluid is replaced by operating the pump or pumps. This operation has the effect of forcing back the spent fluid by the new fluid successively into the different sections of the circuit. Thus, the spent fluid is replaced without the new fluid mixing with the spent fluid and without the air or particles entering the circuit.

Another feature of the invention is that the control circuit includes at least one high pressure filter placed between the delivery branch and at least one supply branch of the control means, the disconnecting step of the tank is followed by connecting the recovery reservoir to the trough of the high pressure filter and to the outlet of the general return filter and the replacement step for the hydraulic fluid includes a first step of replacing the fluid contained in the suction and delivery branches and a second step of replacing the fluid contained in the supply and return branches.

The first step of replacing the fluid is advantageously performed by operating the pump, whereas the second fluid replacement step is performed by an operation of the pump accompanied by at least one manipulation of the control means. The control means is generally manipulated several times after recovery of a given spent fluid quantity.

In practice, the connection step of the recovery reservoir is preceded by a step of dismantling a filter feed trough containing a filtering element and a step of fitting a connection tool container to the casing of the high pressure filter. This connection tool container makes it possible to connect the recovery reservoir to the casing of the high pressure filter and maintain it open if there is an isolating valve for the high pressure filter, which is normally closed when the filter feed trough containing the filtering element is removed.

According to a feature of a preferred embodiment of the invention, the step of connecting the supply means and the recovery reservoir are performed by using flexible tubes.

During the step of replacing the hydraulic fluid, it is advantageous to check the displaced fluid volume, so as to stop the replacement of the fluid when said volume reaches a predetermined threshold.

During the first step of replacing the fluid, it is possible to stop the fluid replacement by closing a tap valve placed in the flexible tube ensuring the connection of the recovery reservoir to the high pressure filter casing.

Another feature of the present invention is that when the control circuit also has a general filter placed in the return branch, the recovery reservoir is connected downstream of said filter and a filtering element contained in said general filter is replaced after disconnecting the recovery reservoir.

DETAILED DESCRIPTION

Figure 1:
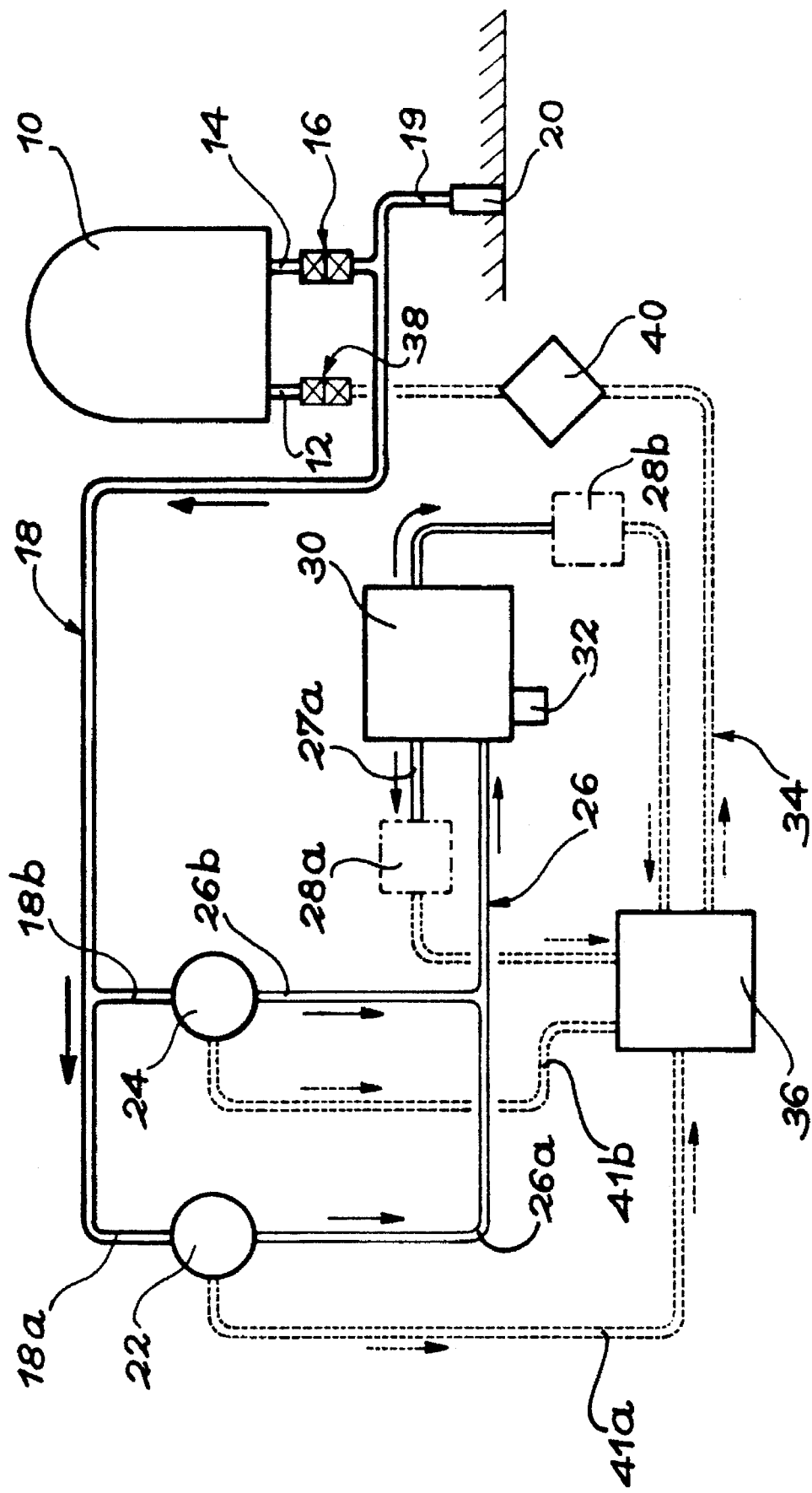
FIG. 1 Diagrammatically shows a hydraulic control circuit equipping an aircraft.

FIG. 1 shows in simplified manner one of the hydraulic control circuits equipping an aircraft. This circuit is used for hydraulically controlling certain of the members of the aircraft, generally in combination with one or more other hydraulic control circuits with an identical design. Among the hydraulic controls which can be performed by the circuit of FIG. 1 servocontrols for engine thrust reverses, the servocontrols serving the right and left wings, the servocontrols serving the rear part of the aircraft, the controls for the flaps and wing slats, the braking circuits, the front wheel orientation circuits, the hatch and landing gear manipulating circuits, the cargo door opening and closing circuits, etc.

The hydraulic control circuit illustrated in FIG. 1 has a tank 10 which can be pressurized and which normally contains a certain hydraulic fluid volume. The tank 10 has an entrance pipe 12 and an exit pipe 14. The tank exit pipe 14 is connected by a tight connector 16 to a suction branch 18 of the circuit. In the vicinity of the tight connector 16, the suction branch 18 has a bypass 19 terminated by a ground connection 20, which is accessible from the outside of the aircraft.

Downstream of the bypass 19, the suction branch 18 is subdivided into several sections, each of which is connected to a suction port of a pump. In the embodiment illustrated in FIG. 1, a first section 18a of the suction branch 18 is connected to a suction port of a mechanical pump 22 and a second section 18b of the suction branch 18 is connected to the suction port of an electric pump 24.

The hydraulic control circuit illustrated in FIG. 1 also has a deliver branch 26 forming the high pressure part of the circuit. This delivery branch 26 connects the delivery port of each of the pumps 22, 24 to one or more control means such as 28a, 28b, etc. serving to actuate or manipulate the aircraft member or members controlled by this circuit.

In the embodiment illustrated in exemplified manner in FIG. 1, the delivery branch 26 has a common section connected upstream by two sections 26a, 26b to the delivery ports of the pumps 22, 24 respectively. The common section of the delivery branch 26 is connected downstream to a high pressure filter 30, which incorporates an interchangeable filtering element 32.

It should be noted that when the circuit has several mechanical pumps identical to the pump 22, each of them is connected to a high pressure filter 30 by a separate delivery branch. An interchangeable filtering element 32 is then associated with each of the branches.

Downstream of the high pressure filter 30, the circuit has the same number of supply branches 27a, 27b, etc. as the circuit has control means 28a, 28b, etc. Downstream of these control means, the branches 27a, 27b, etc. are connected to a low pressure manifold 36.

The hydraulic control circuit illustrated in FIG. 1 also has a return branch 34 by which the low pressure manifold 36 is connected to the entrance pipe 12 of the tank 10. The return branch 34 is connected to the entrance pipe 12 of the tank 10 by a tight connector 38. A general filter 40 having a detachable filtering element is placed in the return branch 34 in the vicinity of the tight connector 38.

Finally, the circuit illustrated in FIG. 1 also has draining branches 41a, 41b, which drain the lubricating fluid from the housing of the pumps. These branches 41a, 41b respectively connect a drainage port formed in the housing of each of the pumps 22, 24 to the low pressure manifold 36. In a hydraulic circuit like that described hereinbefore with reference to FIG. 1, the manipulation of any random one of the members controlled by the control means 28a, 28b, etc. is ensured after at least one of the pumps 22, 24, etc. has been put into operation.

When it is necessary to replace the hydraulic fluid contained in such a circuit, either for changing the fluid type, or to take account of a chemical pollution of the fluid present in the circuit, the following procedure is proposed according to the invention.

Figure 2:
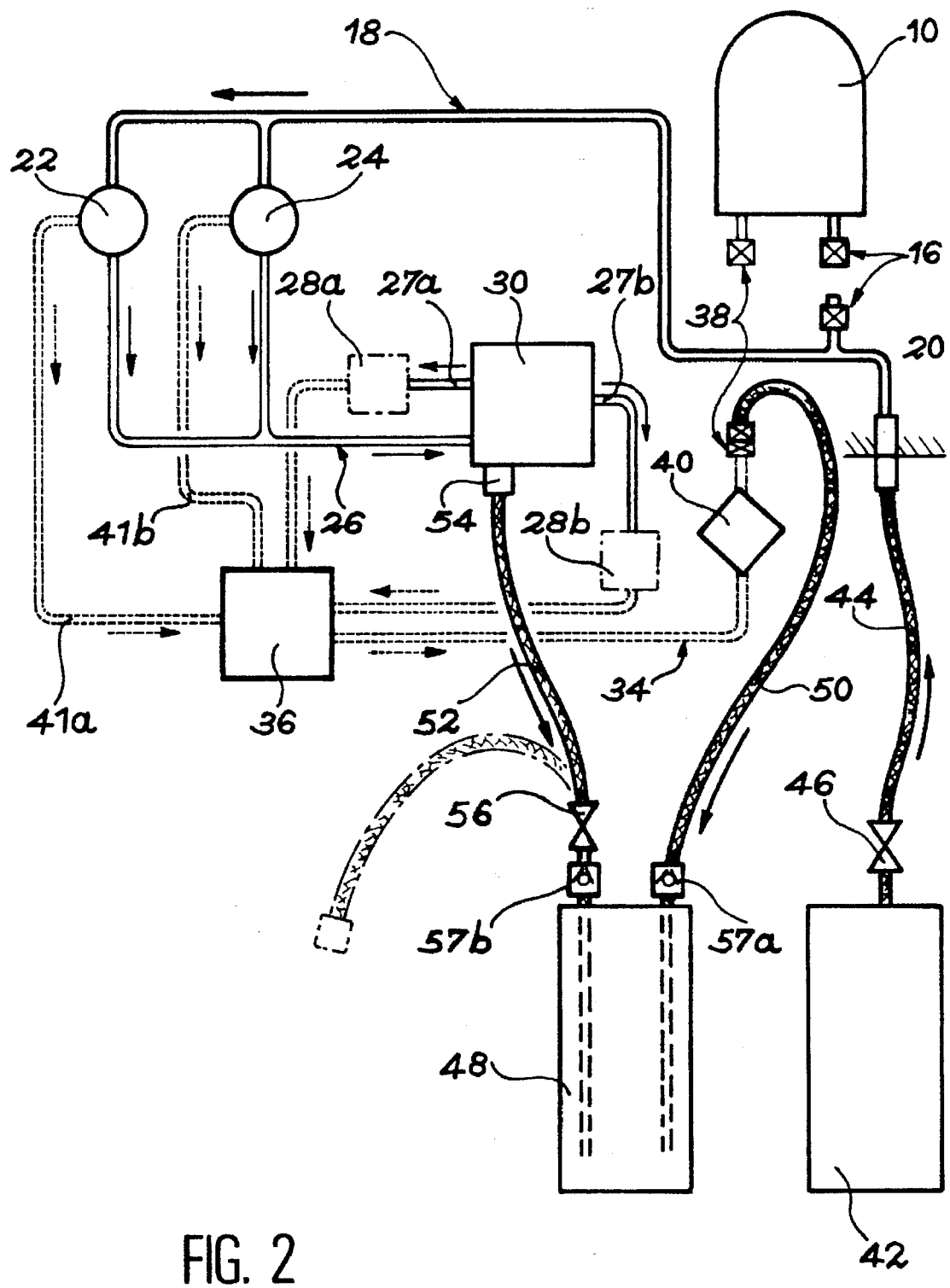
FIG. 2 shows disconnections and connections performed on the circuit of FIG. 1, in order to ensure the replacement of the hydraulic fluid contained in said circuit, in accordance with the process of the invention.

Firstly the operator depressurizes the tank 10 and ensures the emptying thereof by means of the valves and taps equipping said tank. The operator then separates the tank 10 from the remainder of the circuit by disconnecting the tight connectors 16 and 38, as illustrated in FIG. 2.

A new fluid supply means 42 is then connected to the ground connection 20 by means of a flexible tube 44. Said supply means 42 has a large capacity reservoir (e.g. 100 to 150 dm$^3$). The discharge flow rate of the new fluid supply means 42 is e.g. approximately 4 m$^3$/h under a pressure of approximately 300 kPa. It is necessary to fill the reservoir of the supply means 42 when the new fluid quantity contained therein drops below 20 dm$^3$. Moreover, the discharge pressure must not descend below about 200 kPa.

A manual tap valve 46 is preferably placed at the exit of the supply means 42 in order to make it possible to isolate the circuit should this prove necessary (e.g. in the case of depressurization of the circuit or for safety reasons).

In order to be able to replace the hydraulic fluid contained in the circuit, to the latter is also connected a spent fluid recovery reservoir 48. More specifically, the reservoir 48 is connected by a flexible tube 50 to that part of the tight connector 38 fixed to the end of the circuit return branch 34. The recovery reservoir 48 is also connected to the casing of the high pressure filter 30 by means of a flexible tube 52.

The two entrance lines for the recovery reservoir 48 and to which are connected the flexible tubes 50, 52 are provided with check valves 57a, 57b with a low opening threshold.

More specifically, before connecting the flexible tube 52 to the casing of the high pressure filter 30, dismantling takes place of the filter trough 32 and its filtering element (FIG. 1) and they are replaced by a connection tool container 54 (FIG. 2). This connection tool container 54 is designed for fitting in place of the filter trough 32, so as to keep open an isolating valve of the high pressure filter 30, which is normally closed when the filter trough is dismantled. Moreover, the connection tool container 54 is designed to permit the tight connection of the flexible tube 52 to the casing of the high pressure filter 30.

In the case where the high pressure filter 30 has several filter troughs each containing a filtering element, the connection tool container 54 can be fitted in place of any random one of said troughs.

A manual tap 56 is placed in the flexible tube 52 at the entrance of the recovery reservoir 48. In addition, not shown means are respectively associated with the supply means 42 and the reservoir 48, in order to measure the fluid volume leaving the supply means 42 and admitted into the recovery reservoir 48.

When the different connections described hereinbefore with reference to FIG. 2 have been completed, the hydraulic fluid can be replaced in the circuit in sectionwise manner in a way to be described hereinafter.

Firstly replacement takes place of the fluid in the suction branch 18, the delivery branch 26, in the drainage branches 41a, 41b and in the return branch 34.

For this purpose, operation takes place in turn of each of the pumps 22, 24, by progressively opening the tap valve 56 placed at the entrance of the recovery reservoir 48. During the operation of each of the pumps, the tap valve 56 is closed when a hydraulic fluid volume slightly above the overall capacity of the suction 18, delivery 26, drainage 41a or 41b and return 34 branches is reached. The same operation is repeated for each of the pumps 22, 24. It is then ensured that the spent hydraulic fluid has been replaced by a new hydraulic fluid in each of the branches in question.

As is illustrated in mixed line form in FIG. 2, the high pressure part of the circuit is then restored to its normal configuration. In other words, the flexible tube 52 is disconnected from the connection tool container 54, the latter is dismantled and a filter trough 32 containing a new filtering element is put into place. In the case where the high pressure filter 30 has several filtering elements, the latter are all replaced by new filtering elements.

The second step of replacing the hydraulic fluid in the circuit is then performed sectionwise with only the return branch 34 of the circuit connected to the recovery reservoir 48.

Thus, the electric pump 24 is operated and one of the control means 28a, 28b, etc. is completely manipulated in general several times. The number of manipulations of each of the control means essentially depends on the nature of said means. It is necessary to ensure that all the hydraulic fluid contained in the supply branches 27a, 27b etc. of the control means 28a, 28b etc. between the high pressure filter 30 and the low pressure manifold 36, as well as in the return branch 34 is replaced. If necessary, a check on the thus replaced fluid volume is carried out by volumetric measuring means associated with the supply means 42 and the recovery reservoir 48.

If necessary, the operation of the electric pump 24 is preceded by the manipulation of ancillary members such as taps, pressure switches, computers, etc.

Following the replacement of the fluid in the supply branch associated with the control means such as 28a, 28b etc., which have just been manipulated, the electric pump 24 is stopped.

When the hydraulic fluid contained in all the supply branches 27a, 27b etc. associated with the control means such as 28a, 28b, etc. has been replaced, the flexible tubes 44, 50 are respectively disconnected from the ground connection 20 and the part of the tight connector 28 fixed to the end of the return branch 34. The tank 10 is then connected to the circuit by tight connectors 16 and 38, followed by filling and pressurization. The filtering element of the general filter 20 is also replaced The electric pump 24 is then started up and manipulations of the control means 28a, 28b, etc. take place whilst monitoring the level of the hydraulic fluid in the tank 10 until it has stabilized. Optionally filling top-ups take place.

A substantially total replacement of the hydraulic fluid contained in the control circuit can thus be carried out in a particularly simple and reliable manner. The risks of introducing air or creating leaks in the circuit are in practice eliminated. Moreover, the handling of certain fluids which can be irritating for the skin, eyes and respiratory system is minimized.

In the case of a control circuit without a ground connection, the supply means 42 can be directly connected to that part of the tight connector 16 which is fixed to the suction branch 18.

We claim:

1. A simplified process for replacing a hydraulic fluid in an existing fluid control circuit without a need to add valving to the existing fluid control circuit, the existing fluid control circuit including a tank, at least one suction branch connecting the tank to at least one pump, at least one delivery branch connecting the pump to at least one control means, and at least one return branch connecting the control means to the tank, said process comprising the steps of:

depressurizing, emptying and disconnecting the tank from the control circuit;

connecting a new fluid supply means and a spent fluid recovery reservoir respectively on the suction branch and on the return branch, substantially in place of the tank;

replacing the hydraulic fluid in the fluid control circuit by operating the pump, so as to force a spent fluid into the recovery reservoir while drawing fluid from the new fluid supply means;

disconnecting the new fluid supply means and the spend fluid recovery reservoir, then reconnecting the tank to the suction branch and to the return branch; and filling and pressurizing the tank.

2. A simplified process according to claim 1, wherein the existing control circuit includes at least one high pressure filter placed between the delivery branch and at least one supply branch of the at least one control means; and further comprising after the disconnecting step which disconnects the tank, a step of connecting the recovery reservoir to a casing of the high pressure filter; and wherein the step of replacing the hydraulic fluid comprises a first step of replacing a fluid contained in the supply branch and in the return branch.

3. A simplified process according to claim 2, wherein the step of replacing the hydraulic fluid is performed by operating the pump and the drawing step for drawing new fluid from the new fluid supply means is performed by operating the pump while performing a manipulation of the control means.

4. A simplified process according to claim 3, wherein the drawing of the new fluid from the new fluid supply means is carried out by manipulating the control means several times, in order to recover a given spent fluid quantity.

5. A simplified process according to claim 2, wherein the step of connecting the recovery reservoir is preceded by a step of dismantling a filter trough and a step of fitting a connection tool container to the casing of the high pressure filter in place of the filter trough, said connection tool container keeping open an isolating valve of the high pressure filter.

6. A simplified process according to claim 2, wherein during the hydraulic fluid replacement step, there is a step of checking on a displaced fluid volume and the replacement step is stopped when the fluid volume reaches a predetermined threshold.

7. A simplified process according to claim 6, wherein during the fluid replacement step, the fluid replacement is stopped by closing a tap valve placed in a flexible tube ensuring a connection of the recovery reservoir to the high pressure filter casing.

8. A simplified process according to claim 1, wherein the steps of connecting the supply tank and recovery tank are performed by using flexible tubes.

9. A simplified process according to claim 1, wherein the control circuit also has a general filter placed in the return branch, the process further comprising a step of replacing a filtering element contained in said general filter after the step of disconnecting the recovery reservoir.

10. Process for replacing a hydraulic fluid contained in an existing fluid control circuit, wherein the fluid control circuit comprises a tank, at least one suction branch connecting the tank to at least one pump, at least one delivery branch connecting the pump to at least one control means, and at least one return branch connecting the at least one control means to the tank, said process comprising the steps of:

depressurizing, emptying and disconnecting the tank from the control circuit;

connecting a new fluid supply means and a spent fluid recovery reservoir respectively on the suction branch and on the return branch, substantially in place of the tank;

replacing the hydraulic fluid in the fluid control circuit by operating the pump, so as to force a spent fluid into the recovery reservoir while drawing fluid from the new fluid supply means;

disconnecting the new fluid supply means and the spend fluid recovery reservoir, then reconnecting the tank to the suction branch and to the return branch; and filling and pressurizing the tank;

placing at least one high pressure filter between the delivery branch and the at least one supply branch of the control means;

the method further comprising after the disconnecting step which disconnects the tank, a step of connecting the recovery reservoir to a casing of the high pressure filter, and wherein;

the step of replacing the hydraulic fluid comprises a first step of replacing a fluid contained in the supply branch and in the return branch;

the step of replacing the fluid is performed by operating the pump;

and the drawing step for drawing of new fluid from the new fluid supply means is performed by operating the pump while performing at least one manipulation of the control means, in order to recover a given spent fluid quantity.

11. Process for replacing a hydraulic fluid contained in an existing fluid control circuit, wherein the control circuit comprises a tank, at least one suction branch connecting the tank to at least one pump, at least one delivery branch connecting the pump to at least one control means, and at least one return branch connecting the at least one control means to the tank, said process comprising the steps of:

depressurizing, emptying and disconnecting the tank from the control circuit;

connecting a new fluid supply means and a spent fluid recovery reservoir respectively on the suction branch and on the return branch, substantially in place of the tank;

replacing the hydraulic fluid in the fluid control circuit by operating the pump, so as to force a spent fluid into the recovery reservoir while drawing fluid from the new fluid supply means;

disconnecting the new fluid supply means and the spend fluid recovery reservoir, then reconnecting the tank to the suction branch and to the return branch; and filling and pressurizing the tank, placing at least one high pressure filter between the delivery branch and the at least one supply branch of the control means;

and further comprising after the disconnecting step which disconnects the tank, a step of connecting the recovery reservoir to a casing of the high pressure filter, and wherein;

the step of replacing the hydraulic fluid comprises a first step of replacing a fluid contained in the supply branch and in the return branch;

the step of connecting the recovery reservoir is preceded by a step of dismantling a filter trough and a step of fitting a connection tool container to the casing of the high pressure filter in place of the filter trough, said connection tool container keeping open an isolating valve of the high pressure filter.

12. Process for a replacement of a hydraulic fluid contained in an existing fluid control circuit, wherein the fluid control circuit comprises a tank, at least one suction branch connecting the tank to at least one pump, at least one delivery branch connecting the pump to at least one control means, and at least one return branch connecting the control means to the tank, said process comprising the steps of:

depressurizing, emptying and disconnecting the tank from the control circuit;

connecting a new fluid supply means and a spent fluid recovery reservoir respectively on the suction branch and on the return branch, substantially in place of the tank;

replacing the hydraulic fluid in the fluid control circuit by operating the pump, so as to force a spent fluid into the recovery reservoir while drawing fluid from the new fluid supply means;

disconnecting the new fluid supply means and the spend fluid recovery reservoir, then reconnecting the tank to the suction branch and to the return branch; and filling and pressurizing the tank, and placing at least one high pressure filter between the delivery branch and at least one supply branch of the control means; and further comprising after the disconnecting step which disconnects the tank, a step of connecting the recovery reservoir to a casing of the high pressure filter and the step of replacing the hydraulic fluid comprises a first step of replacing the fluid contained in the supply branch and in the return branch, wherein during the hydraulic fluid replacement step, there is a step of checking on a displaced fluid volume and stopping the replacement when said fluid volume reaches a predetermined threshold, closing a tap valve placed in a flexible tube for ensuring the connection of the recovery reservoir to the high pressure filter casing.

* * * * *